(12) United States Patent
Jiao et al.

(10) Patent No.: US 8,890,659 B2
(45) Date of Patent: Nov. 18, 2014

(54) METHOD FOR PREVENTING COLLISION OF RFID TAGS IN AN RFID SYSTEM

(75) Inventors: Hongai Jiao, Shenzhen (CN); Jian Zhang, Shenzhen (CN); Jiang Du, Shenzhen (CN)

(73) Assignee: ZTE Corporation (CN)

( * ) Notice: Subject to any disclaimer, the term of this patent is extended or adjusted under 35 U.S.C. 154(b) by 1227 days.

(21) Appl. No.: 12/740,635

(22) PCT Filed: Jul. 15, 2008

(86) PCT No.: PCT/CN2008/071646
§ 371 (c)(1),
(2), (4) Date: Apr. 29, 2010

(87) PCT Pub. No.: WO2009/059506
PCT Pub. Date: May 14, 2009

(65) Prior Publication Data
US 2010/0259366 A1    Oct. 14, 2010

(30) Foreign Application Priority Data

Nov. 8, 2007  (CN) .......................... 2007 1 0166244

(51) Int. Cl.
*H04Q 5/22* (2006.01)
*G06K 7/10* (2006.01)
*G06K 7/00* (2006.01)

(52) U.S. Cl.
CPC .......... *G06K 7/0008* (2013.01); *G06K 7/10019* (2013.01)
USPC ....................................... 340/10.2

(58) Field of Classification Search
CPC ........................ G06K 7/10019; G06K 7/0008
See application file for complete search history.

(56) References Cited

U.S. PATENT DOCUMENTS

| 6,061,344 A | * | 5/2000 | Wood, Jr. ...................... 370/346 |
| 7,009,495 B2 | * | 3/2006 | Hughes et al. ............... 340/10.2 |
| 2007/0200677 A1 | * | 8/2007 | Murano .................... 340/10.31 |

FOREIGN PATENT DOCUMENTS

| CN | 1790366 | 6/2006 |
| CN | 101069193 | 11/2007 |
| KR | 20060115694 | 11/2006 |

* cited by examiner

*Primary Examiner* — Edwin Holloway, III
(74) *Attorney, Agent, or Firm* — Brooks Kushman P.C.

(57) ABSTRACT

The method includes: a reader begins to count the tags, and waits for feedback of the tags; the tags are split into two subsets if the tags feedback the collision, the tags of one of the subsets feedback, the tags of the other subset begin to feedback when the tags of one of the subsets complete the count; when the collision occurs in the course of feedback, then the split continues until all the tags are completed the count; the tags of many branches are at least once split simultaneously when the tags of the subsets are split.

5 Claims, 6 Drawing Sheets

FIG. 6

US 8,890,659 B2

METHOD FOR PREVENTING COLLISION OF RFID TAGS IN AN RFID SYSTEM

TECHNICAL FIELD

The present invention relates to the field of wireless communication, and in particular, to a method for preventing collision of tags in the radio frequency identification (RFID) field.

BACKGROUND OF THE RELATED ART

In practical application of RFID, in many cases, there is one reader corresponding to multiple electronic tags in a radio frequency field. When the reader inventories multiple electronic tags simultaneously, channel contention will appear and collision will occur, so electronic tags are incapable of sending information to the reader correctly. Therefore, some mechanism needs to be adopted to avoid the collision or reduce the possibility of collision.

In the current RFID international standard ISO18000-6, the A-type and C-type adopt the Slotted ALOHA algorithm, and the B-type adopts the Binary Tree algorithm, to solve the collision problem. Both the Slotted ALOHA and Binary Tree algorithms are based on time division multiple access.

The Slotted ALOHA algorithm divides time into several discrete timeslots, requires the tag to select one of the timeslots randomly, and to send data on the boundary of the timeslot. In ISO18000-6 A-type and C-type protocols, the process to achieve collision prevention by using Slotted ALOHA algorithm is: at the beginning of each inventory process, the reader notifies all the tags of a selectable timeslot range, the tag selects one of the timeslots randomly to reply, the tag either sends data successfully or collides completely, and if the collision occurs, the tag reselects a timeslot and sends the data till all the tags send data successfully.

Figure 1:
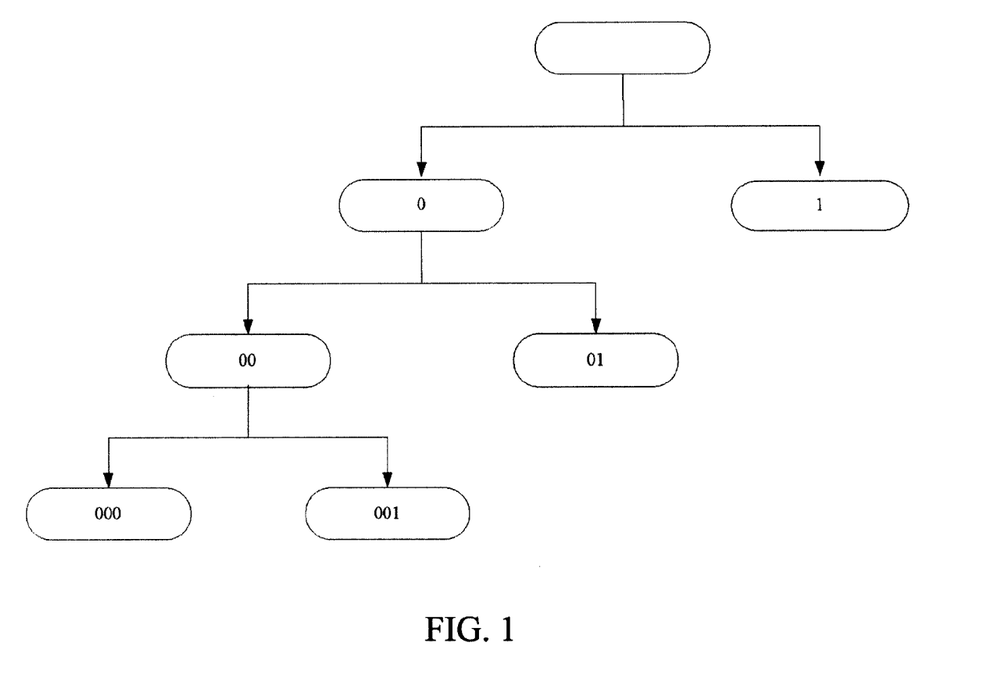
FIG. 1 is a schematic drawing of the current Binary Tree algorithm.

The basic conception of the Binary Tree method is similar to the Depth First Traversal of a Binary Tree; the method splits the tags in collision into two subsets 0 and 1, queries subset 0 first, identifies the tags correctly if there is no conflict, or further splits subset 0 into two subsets 00 and 01 if there is a conflict, and so on, till all the tags in subset 0 are identified, and then queries subset 1 according to these steps. The Binary Tree algorithm is shown in FIG. 1. In ISO18000-6 B-type protocol, the process to achieve collision prevention by using the Binary Tree algorithm is: the reader sends a start inventory instruction to make all the tags begin to reply, and after the tags receive the instruction, a randomizer generates 0 or 1, such that the tags are split into two subsets with the random numbers of 0 and 1, the two subsets are called a left branch (branch 0) and a right branch (branch 1) respectively, corresponding to a Binary Tree herein; the tags with the random number 0, i.e. the tags in the left branch, reply at once and have an innate advantage of prior replying, while the tags with the random number 1, i.e. the tags in the right branch, have to wait till the left branch completes replying before performing splitting and replying; and if there is no collision and the replying is successful, then the reader sends an acknowledgement instruction and makes the counter values of the tags decrease by 1; if the tags collide, the reader sends an instruction to make the tags whose counter values are 0, i.e. the tags in the left branch split again, and for the tags whose counter values are non-zero, i.e. the tags in the right branch, the counter values increase by 1; such process is repeated till all the tags reply successfully.

Figure 4:
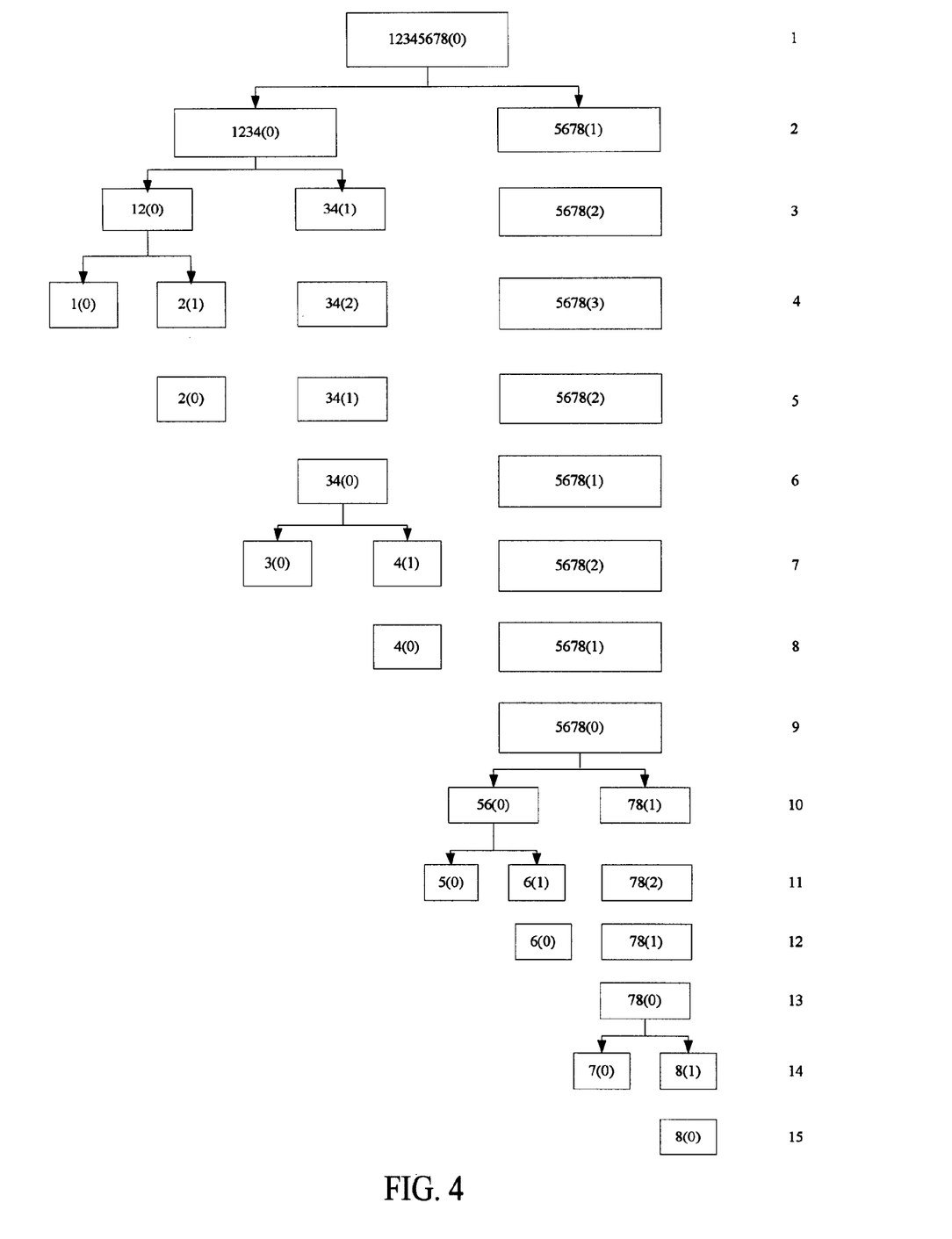
FIG. 4 is a schematic drawing of an exemplary inventory process applying a method according to the ISO18000-6.

FIG. 4 illustrates the inventory process of 8 tags, which is the inventory process in ISO18000-6, and the numbers on the right represent the numbers of current timeslots in the inventory process.

Brief description of the inventory process in ISO18000-6 is as follows:

1. timeslot, initializing, counter values of the tags being all 0;
2. timeslot, colliding, splitting into 00001111, the tags whose counter values are 0 replying;
3. timeslot, colliding, and splitting again into 00112222, the tags whose counter values are 0 replying;
4. timeslot, colliding, and splitting again into 01223333, the tag whose counter value is 0 replying successfully;
5. timeslot, the counter values decreasing by 1, being 0112222, the tag whose counter value is 0 replying successfully;
6. timeslot, the counter values decreasing by 1, being 001111, the tags whose counter values are 0 replying;
7. timeslot, colliding, and splitting again into 012222, the tag whose counter is 0 replying successfully; (possibly splitting into 112222 herein, to facilitate the description, setting aside consideration of this situation);
8. timeslot, the counter values decreasing by 1, being 01111, the tag whose counter value is 0 replying successfully;
9. timeslot, the counter values decreasing by 1, being 0000, the tags whose counter values are 0 replying;
10. timeslot, colliding, splitting into 0011, the tags whose counter values are 0 replying;
11. timeslot, colliding, splitting again into 0122, the tag whose counter value is 0 replying successfully (possibly splitting into 1122 herein, to facilitate the description, setting aside consideration of this situation);
12. timeslot, the counter values decreasing by 1, being 011, the tag whose counter value is 0 replying successfully;
13. timeslot, the counter values decreasing by 1, being 00, the tags whose counter values are 0 replying;
14. timeslot, colliding, splitting into 01, the tag whose counter value is 0 replying successfully;
15. timeslot, the counter value decreasing by 1, being 0, the tag whose counter value is 0 replying successfully;

It takes 15 timeslots to inventory the 8 tags.

From the description of the collision prevention process in ISO18000-6 B-type protocol and the example described above, it can be seen that the process always endeavors to solve the collision of branch 0 first, the branch 0 is made split till it has only one tag left, i.e. a leaf node of the Binary Tree, and after inventory of it, processing of the tags of branch 1 begins, and after processing of the branch 1 is completed, branches 2, 3, . . . , n are processed in sequence, i.e., splitting and inventory are always performed from left to right. During splitting of branch 0, the multiple tags of non-zero branches don't split, and wait for the completion of the inventory of the tags in branch 0. In this way, after the inventory of the branch 0 is completed, subsequent branches will consume a lot of time to execute the splitting process similar to that of branch 0.

SUMMARY OF THE INVENTION

The technical problem to be solved by the present invention is to provide a method for preventing collision of tags in a RFID system, so that collisions in replying by the tags can be reduced and efficiency of inventorying multiple tags can be increased.

The technical scheme adopted by the present invention is: a method for preventing collision of tags in a radio frequency identification (RFID) system, comprising:

a reader beginning to inventory tags, and waiting for replies of the tags;

if replies of the tags collide, splitting the tags into two subsets, the tags in one of the subsets replying to the reader, and when inventory of the tags in the subset is completed, the tags in the other subset beginning to reply;

if collision occurs during the replying by the tags in the subset, the subset splitting again, and so forth, till inventory of all the tags is completed; and during splitting of the tags in the subsets, performing simultaneous splitting of a plurality of branches of tags at least once.

Furthermore, one of the two subsets is referred to as left branch tags, and the other subset is referred to as right branch tags;

a randomizer is used in splitting of the tags, the tags with random number 0 generated are the left branch tags, and the tags with random number 1 generated are the right branch tags.

Moreover, the method may further comprise:

setting counters for the tags, an initial value of each counter being 0, and all the tags beginning to reply.

Moreover, the method may further comprise:

during inventory of the tags, if the reader receives correct reply information from a tag or no reply information in a specified timeslot and the inventory of the tags is not completed, then sending a success acknowledgement instruction to the tags and entering a next timeslot for reception;

when the tags receive the success acknowledgement instruction, the tag that sends the correct reply information leaving the inventory process and no more responding to an instruction associated with the inventory, counter values of the other tags decreasing by 1, and the tag whose counter value is 0 replying to the reader.

Moreover, the method may further comprise:

during inventory of the tags, if the reader receives collision error information from the tags in a specified timeslot, then sending a failure acknowledgement instruction to the tags, and entering a next timeslot for reception;

when the tags receive the failure acknowledgement instruction, the branches of the tags whose counter values satisfy a specified splitting rule performing splitting, each branch splitting into two branches, and modifying each counter value, in modification, ensuring that an order of the counter values is consistent with an order of the replying by the tags, then the tag whose counter value is 0 replying to the reader.

Furthermore, during splitting of the tags, the specified splitting rule is specified by the reader and sent to the tags, or determined by the tags based on information thereof.

Moreover, the method may further comprise:

adding m parameters brand[1], brand[2], ..., brand[m] in the failure acknowledgement instruction, wherein if i<j, brand[i]<brand[j], and brand[1] is always 0;

when the tags receive the failure acknowledgement instruction, the tag whose counter value n is equal to any of the m parameters participating in the splitting process, assuming n=brand[i], 1≤i≤m; starting a randomizer, for the tag with random number 0 generated, modifying the counter value to n+i−1; for the tag with random number 1 generated, modifying the counter value to n+i; and for the tag whose counter value n is different from each of the m parameters, modifying the counter value to n+m if n>brand[m], otherwise modifying the counter value to n+i if brand[i]<n<brand[i+1].

Furthermore, the method specifically comprises the following steps of:

101, the reader sending a start inventory instruction, and beginning to receive signals from the tags on a specified timeslot;

102, after receiving the start inventory instruction, the tags initializing information thereof, a counter of each tag being set to 0, and all the tags beginning to reply;

103, the reader judging whether correct reply information from a tag, or no reply information, or collision error information is received in the specified timeslot, in the case of correct reply information or no reply information, turning to step 108, and in the case of collision error information, turning to step 106;

104, the reader sending a success acknowledgement instruction, entering a next timeslot to receive signals from the tags, and turning to step 105;

105, when the tags receive the success acknowledgement instruction, the tag that sends the correct reply information leaving the inventory process and no more responding to an instruction associated with the inventory, counter values of the other tags decreasing by 1, and the tag whose counter value is 0 replying to the reader, then proceeding to step 103;

106, the reader sending a failure acknowledgement instruction, entering a next timeslot for reception, and turning to step 107;

107, when the tags receive the failure acknowledgement instruction, the branches of the tags whose counter values satisfy a specified splitting rule performing splitting, each branch splitting into two branches, and modifying each counter value, in modification, ensuring that an order of the counter values is consistent with an order of the replying by the tags, then the tag whose counter value is 0 replying to the reader, and proceeding to step 103;

108, judging whether the reader has identified all the tags, if yes, ending, otherwise returning to step 104.

To sum up, the present invention provides a method for preventing collision of tags in a RFID system, when tags receive a failure acknowledgement instruction, not only the branch 0 splits, but also non-zero branches pre-split dynamically according to a certain rule, thereby avoiding the situation that the non-zero branches keep waiting and wasting time when branch 0 is splitting until one of the tags replies. In addition, as long as an appropriate splitting rule is ensured, too many idle timeslots will not be brought about, and thus efficiency of the inventory is increased greatly.

PREFERRED EMBODIMENTS OF THE PRESENT INVENTION

The technical scheme of the present invention will be described in detail below with reference to the drawings and embodiments.

To obtain higher efficiency of tag inventory, the present invention improves the Binary Tree algorithm, and proposes a parallel splitting Binary Tree method for preventing tag collision. The specifics are as follows: a reader begins to inventory tags and waits for replies of the tags, if replies of the tags collides, the tags are split into two subsets, tags of one of the subsets reply the reader, and after the inventory of the tags in the subset is completed, tags of the other subset begins to reply; and if collision occurs in the process of the replying by the tags in the subset, the subset is split again, and so forth, till inventory of all the tags are completed. Based on the algorithm described above, what is improved in the present invention is that during splitting of the tags in subsets, simultaneous splitting of multiple branches of tags is performed at least once. Wherein, one of the two subsets is called left branch tags, and the other subset is called right branch tags, and the left and right do not represent the order of the branches, that is, the left and right branches do not represent the branches on the left or right, but are used to represent the order of the replying by the tags. In the two subsets generated by splitting tags, there may be an empty set.

If branch 0 is used to represent the left branch, then the parallel splitting Binary Tree method for preventing tag collision proposed by the present invention is: while splitting the tags in branch 0, designating the tags in non-zero branches which will be split simultaneously, so that the tags of the non-zero branches are pre-split. And specifically, how many non-zero branches are designated and which non-zero branches of tags are designated to be split depend on a specific situation. In this way, by splitting non-zero branches and the branch 0 in parallel, i.e., by arranging the order of the tags in the non-zero branches in advance rather than waiting for the completion of the inventory of the branch 0 before beginning to split for order arrangement, the collision timeslots can be reduced greatly and efficiency of the inventory can be increased.

Figure 3:
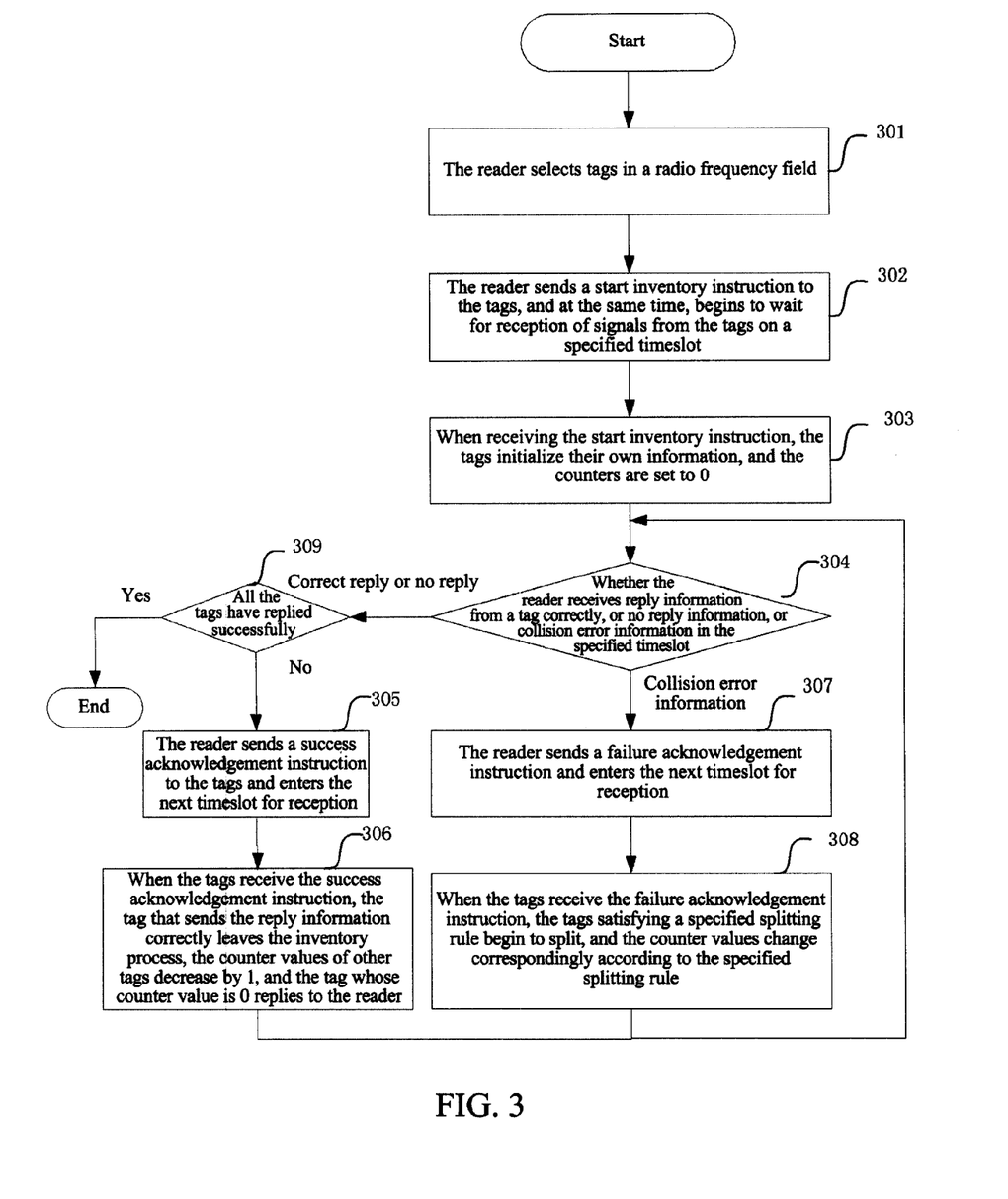
FIG. 3 is a flowchart of the interaction between a reader and tags during inventory of multiple tags in the present invention.

FIG. 3 is a flowchart of the interaction between a reader and tags during inventory of multiple tags in the present invention, comprising:

step 301, the reader selecting the tags in an effective radio frequency field;

wherein the reader sends a selection instruction, all the tags perform condition matching after receiving the selection instruction, and the tags satisfying the conditions enter the inventory process;

step 302, the reader sending a start inventory instruction, and at the same time beginning to receive signals from the tags on a specified timeslot;

step 303, after receiving the start inventory instruction, the tags initializing their own information, the counters being set to 0, and the tags whose counter values are 0 replying the reader;

step 304, judging whether the reader receives reply information from a tag correctly, or no reply information, or collision error information in the specified timeslot, turning to step 309 if correct reply information or no reply information is received, and turning to 307 if collision error information is received;

step 305, the reader sending a success acknowledgement instruction to the tags and entering the next timeslot for reception;

step 306, when the tags receive the success acknowledgement instruction, the tag whose ID (identification) coincides with the parameter of the success command (i.e. the tag that sends the reply information correctly) leaving the inventory process after returning an acknowledgement success and no more responding to an instruction associated with the inventory, the counter value of the tag whose ID does not coincide with the parameter of the success command (i.e. the tag whose counter value is non-zero) decreasing by 1, and the tag whose counter value is 0 replying the reader, and then proceeding to step 304;

if no reply information of the tags is received in step 305, and by then there is no tag acknowledging, then counter values of all the tags decrease by 1;

step 307, if the reader receives collision error reply information from the tags in the specified timeslot, the reader considering that multiple tags reply and collision occurs, so sending a failure acknowledgement instruction to the tags and entering the next timeslot for reception, and then proceeding to step 308;

step 308, when the tags receive the failure acknowledgement instruction, the tags, whose counter values satisfy a specified splitting rule, performing splitting, starting a randomizer, and those tags modifying the counter values according to the generated random numbers and the specified the splitting rule, the tags dissatisfying the pre-specified splitting rule (i.e. the tags that are not required to perform pre-splitting) modifying their counter values correspondingly according to the specified splitting rule, and how to modify the counter values being determined by the specified splitting rule and the information of the tags, and then the tag whose counter value is 0 replying the reader; wherein, during the modification, it should be ensured that the order of the counter values is consistent with the order of the replying by the tags, and the tag whose counter value is larger has to wait until the tags whose counter values are smaller have replied successfully before performing replying; then proceeding to step 304;

step 309, judging whether all the tags have replied successfully, if yes, ending, otherwise, turning to step 305.

The above-mentioned pre-specified splitting rule can be specified by the reader and sent to the tags, or the tags determine by themselves whether to split or not, according to their own information.

Further, an implementation of the rule can be accomplished in the step 307 in conjunction with the step 308. And the specific process is as follows: adding m parameters brand [1], brand[2], . . . , brand[m] (wherein if i<j, brand[i]<brand [j]) in the failure acknowledgement instruction in step 307, wherein the parameter m is used to specify m−1 non-zero branches that are required to pre-split and have a counter value of brand[i] (2≤i≤m), brand[1] is always 0, indicating branch 0 will split. In the step 308, when the tags receive the failure acknowledgement instruction, the tags that have a counter value n equal to any of the m parameters participate in the splitting process; assuming n=brand[i], and 1≤i≤m, start the randomizer, for the tag with 0 generated, the counter value is modified to n+i−1, and for the tag with 1 generated, the counter value is modified to n+i; for the tags that have a counter value n different from each of the m parameters, if the counter value n>brand[m], the counter value is modified to n+m, otherwise, if brand[i]<n<brand[i+1], then the counter value is modified to n+i.

Figure 6:
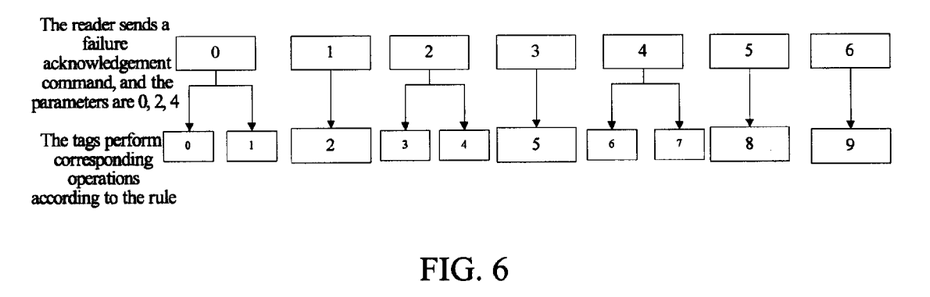
FIG. 6 is a schematic drawing of pre-splitting according to an embodiment of the present invention.

An example is given according to the implementation process of the rule. As shown in FIG. 6, assuming that the counter values of the tags in current system is 0, 1, 2, 3, 4, 5, 6 respectively, and the reader receives collision error information replied by the tags, then the reader executes the step 307 to send a failure acknowledgement command, wherein m=3, brand[1]=0, brand[2]=2, brand[3]=4. After the failure acknowledgement command is received, the step 308 is executed, and according to the rule, the tags whose counter values are 0, 2, 4 correspond to brand[1], brand[2], brand[3] respectively, so these tags perform splitting; the tag whose counter value is 0 (n=0) corresponds to brand[1] (i=1), so if the tag generates a random number 0, according to the rule, the counter value is changed to n+i−1, herein n=0, i=1, then the counter value is changed to 0; if the tag generates a random number 1, then the counter value is changed to n+i, and as n=0,i=1, the counter value is changed to 1. Similarly, the tags whose counter values are 2 and 4 perform the splitting too. The tag whose counter value is 2 corresponds to parameters n=2, i=2, so if random number 0 is generated, the counter value is changed to 3, otherwise, it is changed to 4. For the tag whose counter value is 4, if random number 0 is generated, the counter value is changed to 6, otherwise, it is changed to 7. The tags whose counter values are 5 and 6 satisfy n>brand[m], and since n is currently 5 and 6 respectively, while m=3, brand[3]=4, for the tags whose counter values are 5 and 6, the counter values are added by m (m=3) and become 8 and 9. The tags whose counter values are 1 and 3 are within the splitting tags, wherein brand[1]<1<brand[2], brand[2]<3<brand[3], so according to the rule, for the tag whose counter value is 1, the counter value is added by 1 and become 2, and for the tag whose counter value is 3, the counter value is added by 2 and become 5. As such, not only pre-splitting is implemented but also it is guaranteed that the branches will not overlap during splitting.

In the step 309, whether all the tags have replied successfully is judged, if yes, end, otherwise the tag whose counter value is 0 replies to the reader, then turn to step 304.

The parallel splitting Binary Tree method for preventing tag collision improves the Binary Tree method for preventing tag collision and implements dynamic pre-splitting of non-zero branches, as a result, as long as the pre-splitting method is appropriate, the non-zero branches can be pre-split properly, without bringing about too many idle timeslots, therefore, the efficiency of tag inventory is increased greatly. In addition, in the case of m=1, brand[m]=0, it is ISO18000-6 B-type protocol, so it has an advantage of being compatible with the original standard protocol.

Figure 2:
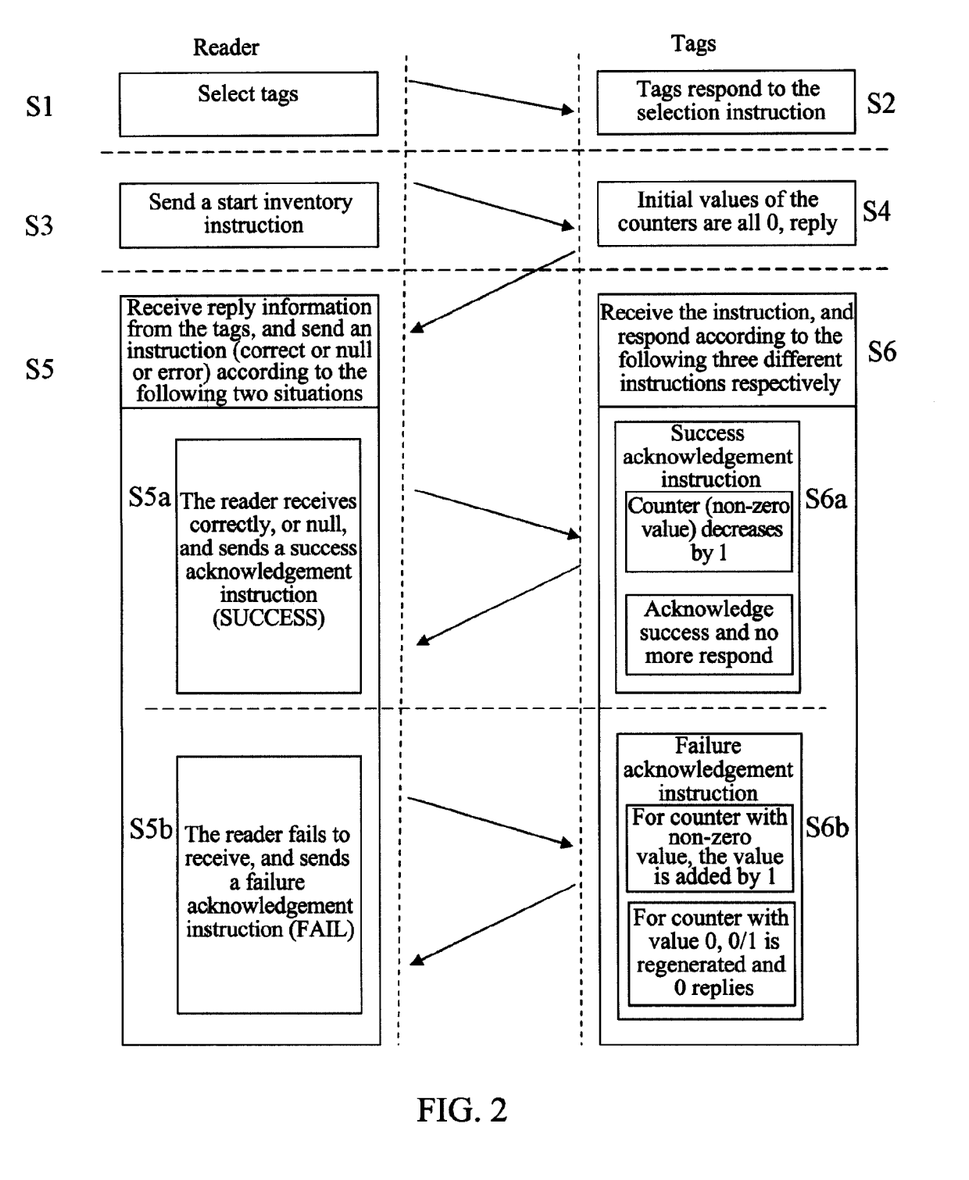
FIG. 2 is a flowchart of the interaction between a reader and tags during inventory of multiple tags in ISO18000-6.

As shown in FIG. 2 and FIG. 3, the innovation of the present invention, compared to the method of ISO18000-6, mainly lies in: in the inventory process, when tags select timeslots to reply and collision occurs, the reader sends a failure command, and in contrast with the ISO18000-6, in the present invention, when the tags receive the failure command, not only the branch 0 splits, but also non-zero branches pre-split dynamically according to a certain rule, thereby avoiding the situation that the non-zero branches keep waiting and wasting time when branch 0 is splitting to find one of the tags to reply. In addition, as long as an appropriate splitting rule is ensured, too many idle timeslots will not be brought about, and thus efficiency of the inventory is increased greatly.

Of course, the present invention is not limited to the example as described above, but may adopt other pre-splitting methods, the implementation as described above is just a particular example. Furthermore, in the above inventory process, when each branch splits, in stead of using the manner with a randomizer generating 0, 1, any other splitting manner that can split the branch into two branches may be used. Finally, the counter value is not limited to the values described above, actually, the counter value represents the order of the replying by the tags, and at the same moment, the tag with the smallest counter value replies, therefore, the only requirement is that the counter value can ensure the order of the replying by the tags. Further, the counter may not be used, and any other manner that can indicate the replying order of the tags may be used.

A specific example of right branch level-1 pre-splitting (i.e., m=2, brand[1]=0, brand[2]=1) is given below. Since the average probability of selecting the random numbers 0 and 1 is 50% each, we use this typical characteristic to split the tags, so as to illustrate the process of the present invention and compare it with the method of ISO18000-6.

Figure 5:
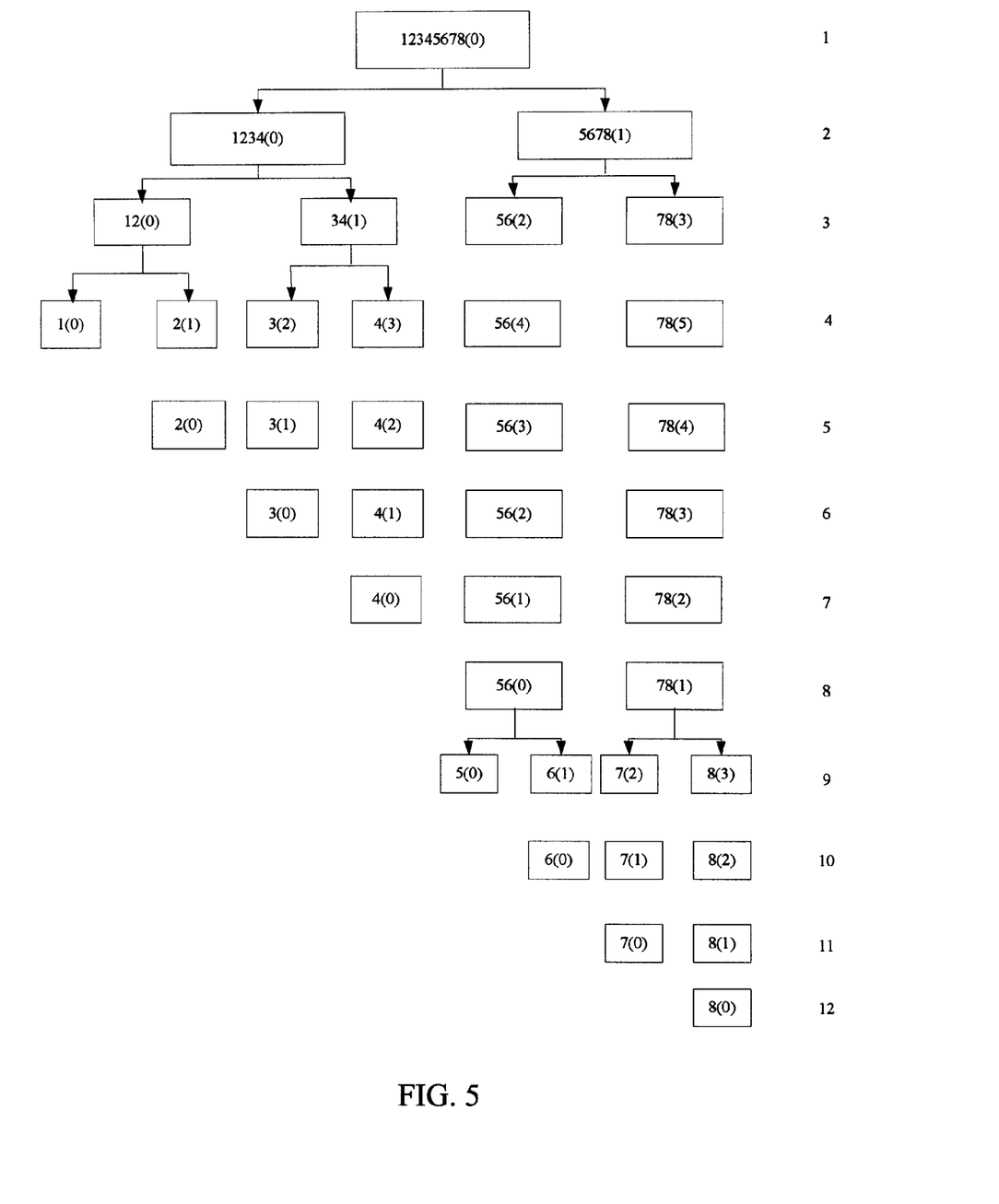
FIG. 5 is a schematic drawing of an inventory process according to an embodiment of the present invention.

FIG. 5 illustrates an inventory process of 8 tags, which is an inventory process with a right branch splitting level of fixed level-1. The numbers on the right represent the numbers of the current timeslots in the inventory process.

Brief description of the inventory process of the present invention is as follows:
1. timeslot, initializing, the counter values of the tags being all 0;
2. timeslot, colliding, splitting into 00001111, the tags whose counter values are 0 replying;
3. timeslot, colliding, and splitting again into 00112233, the tags whose counter values are 0 replying;
4. timeslot, colliding, and splitting again into 01234455, the tag whose counter value is 0 replying successfully;
5. timeslot, the counter values decreasing by 1, being 0123344, the tag whose counter value is 0 replying successfully;
6. timeslot, the counter values decreasing by 1, being 012233, the tag whose counter value is 0 replying successfully;
7. timeslot, the counter values decreasing by 1, being 01122, the tag whose counter value is 0 replying successfully;
8. timeslot, the counter values decreasing by 1, being 0011, the tags whose counter values are 0 replying;
9. timeslot, colliding, splitting into 0123, the tag whose counter value is 0 replying successfully;
10. timeslot, the counter values decreasing by 1, being 012, the tag whose counter value is 0 replying successfully;
11. timeslot, the counter values decreasing by 1, being 01, the tag whose counter value is 0 replying successfully;
12. timeslot, the counter value decreasing by 1, being 0, the tag whose counter value is 0 replying successfully;

It takes 12 timeslots to inventory the 8 tags.

From the figure, it can be seen that:
1) To inventory 8 tags, the method of ISO18000-6 uses 15 timeslots, while the method of the present invention uses 12 timeslots.
2) The splitting of branch 0 in timeslots (3), (6), (9), (10), (13) in ISO18000-6 B-type method is improved in the present invention by splitting branch 0 and branch 1 simultaneously.
3) The process of decreasing by 1 in a single branch in timeslots from (5) to (6), from (8) to (9), and from (12) to (13) in ISO18000-6 B-type method can be skipped in the present invention, thereby saving the inventory timeslots and reduce the inventory time.

The example is of the right branch fixed level-1 pre-splitting. If certain precision can be ensured, the distribution of non-zero branches is estimated, and then pre-splitting of non-zero branches is performed, for example, by determining the number of successive collisions in prior inventory process, if the number of the collisions exceeds n, an appropriate m is determined, and the number of pre-splitting non-zero branches is given, and then brand[i] (2≤i≤m) is given to determine which non-zero branches will split. Successive collisions of branch 0 indicate that the number of tags in branch 0 is larger than 1 in terms of probability. According to the equal probability of the random numbers 0 and 1, the non-zero branches are very likely in the same situation, then pre-splitting of the non-zero branches can reduce the time of the waiting by the non-zero branches for completion of the inventory of branch 0 before beginning to split, therefore, efficiency of the inventory is further increased.

In the above examples, only the situation in which 00 splits into 01 is described. However, 00 may also split into 11, and in this case, the reader will not receive the replying information of the tags in the next timeslot. Of course, the present invention may have many other embodiments, and without departing from the spirit and essence of the present invention, those skilled in the art can make various corresponding modifications and variations, but all these corresponding modifications and variations shall be within the protection scope of the appended claims.

INDUSTRIAL APPLICABILITY

When tags receive a failure acknowledgement instruction, not only the branch 0 splits, but also non-zero branches pre-split dynamically according to a certain rule, thereby avoiding the situation that the non-zero branches keep waiting and wasting time when branch 0 is splitting until one of the tags replies. In addition, as long as an appropriate splitting rule is ensured, too many idle timeslots will not be brought about, and thus efficiency of the inventory is increased greatly.

What we claim is:

1. A method for preventing collision of tags in a radio frequency identification (RFID) system comprising:
   a reader beginning to inventory tags and waiting for replies of the tags;
   setting counters for the tags, an initial value of each counter being 0, and all the tags beginning to reply;
   if replies of the tags collide, splitting the tags into two subsets, the tags in one of the subsets replying to the reader, and when inventory of the tags in the subset is completed, the tags in the other subset beginning to reply;
   if collision occurs during the replying by the tags in the subset, the subset splitting again, and so forth, till inventory of all the tags is completed; and
   during splitting of the tags in the subsets, performing simultaneous splitting of a plurality of branches of tags at least once;
   during inventory of the tags, if the reader receives collision error information from the tags in a specified timeslot, then sending a failure acknowledgement instruction to the tags, and entering a next timeslot for reception;
   when the tags receive the failure acknowledgement instruction, the branches of the tags whose counter values satisfy a specified splitting rule performing splitting, each branch splitting into two branches, and modifying each counter value, in modification, ensuring that an order of the counter values is consistent with an order of the replying by the tags, then the tag whose counter value is 0 replying to the reader;
   adding m parameters brand[1], brand[2], . . . , brand[1] in the failure acknowledgement instruction, wherein if i<j, brand[i]<brand[j], and brand[j] is always 0; and
   when the tags receive the failure acknowledgement instruction, the tag whose counter value n is equal to any of the m parameters participating in the splitting process, assuming n=brand[i], 1≤i≤m; starting a randomizer, for the tag with random number 0 generated, modifying the counter value to n+i−1; for the tag with random number 1 generated, modifying the counter value to n+i; and for the tag whose counter value n is different from each of the m parameters, modifying the counter value to n+m if n>brand[m], otherwise modifying the counter value to n+i if brand[i]<n<brand[i+1].

2. The method of claim 1 wherein,
   one of the two subsets is referred to as left branch tags, and the other subset is referred to as right branch tags;
   a randomizer is used in splitting of the tags, the tags with random number 0 generated are the left branch tags, and the tags with random number 1 generated are the right branch tags.

3. The method of claim 1 further comprising:
   during inventory of the tags, if the reader receives correct reply information from a tag or no reply information in a specified timeslot and the inventory of the tags is not completed, then sending a success acknowledgement instruction to the tags and entering a next timeslot for reception;
   when the tags receive the success acknowledgement instruction, the tag that sends the correct reply information leaving the inventory process and no more responding to an instruction associated with the inventory, counter values of the other tags decreasing by 1, and the tag whose counter value is 0 replying to the reader.

4. The method of claim 1 wherein,
   during splitting of the tags, the specified splitting rule is specified by the reader and sent to the tags, or determined by the tags based on information thereof.

5. The method of claim 1 wherein the method specifically comprises the following steps of:
   101, the reader sending a start inventory instruction, and beginning to receive signals from the tags on a specified timeslot;
   102, after receiving the start inventory instruction, the tags initializing information thereof, a counter of each tag being set to 0, and all the tags beginning to reply;
   103, the reader judging whether correct reply information from a tag, or no reply information, or collision error information is received in the specified timeslot, in the case of correct reply information or no reply information, turning to step 108, and in the case of collision error information, turning to step 106;
   104, the reader sending a success acknowledgement instruction, entering a next timeslot to receive signals from the tags, and turning to step 105;
   105, when the tags receive the success acknowledgement instruction, the tag that sends the correct reply information leaving the inventory process and no more responding to an instruction associated with the inventory, counter values of the other tags decreasing by 1, and the tag whose counter value is 0 replying to the reader, then proceeding to step 103;
   106, the reader sending a failure acknowledgement instruction, entering a next timeslot for reception, and turning to step 107;
   107, when the tags receive the failure acknowledgement instruction, the branches of the tags whose counter values satisfy a specified splitting rule performing splitting, each branch splitting into two branches, and modifying each counter value, in modification, ensuring that an order of the counter values is consistent with an order of the replying by the tags, then the tag whose counter value is 0 replying to the reader, and proceeding to step 103;
   108, judging whether the reader has identified all the tags, if yes, ending, otherwise returning to step 104.

* * * * *

UNITED STATES PATENT AND TRADEMARK OFFICE
CERTIFICATE OF CORRECTION

PATENT NO.         : 8,890,659 B2                              Page 1 of 1
APPLICATION NO.    : 12/740635
DATED              : November 18, 2014
INVENTOR(S)        : Jiao et al.

It is certified that error appears in the above-identified patent and that said Letters Patent is hereby corrected as shown below:

In the Claim

Column 9, Line 54, Claim 1:

After "brand[1], brand [2], . . . brand"
Delete "[1]" and
Insert -- [m] --.

Column 9, Line 56, Claim 1:

After "brand[i],<brand[j] and brand"
Delete "[j]" and
Insert -- [1] --.

Signed and Sealed this
Thirty-first Day of March, 2015

Michelle K. Lee
*Director of the United States Patent and Trademark Office*